Aug. 18, 1942.  A. E. OSBORN  2,293,213
BRAKE MECHANISM
Filed July 1, 1941  2 Sheets-Sheet 1

INVENTOR
Alden E. Osborn

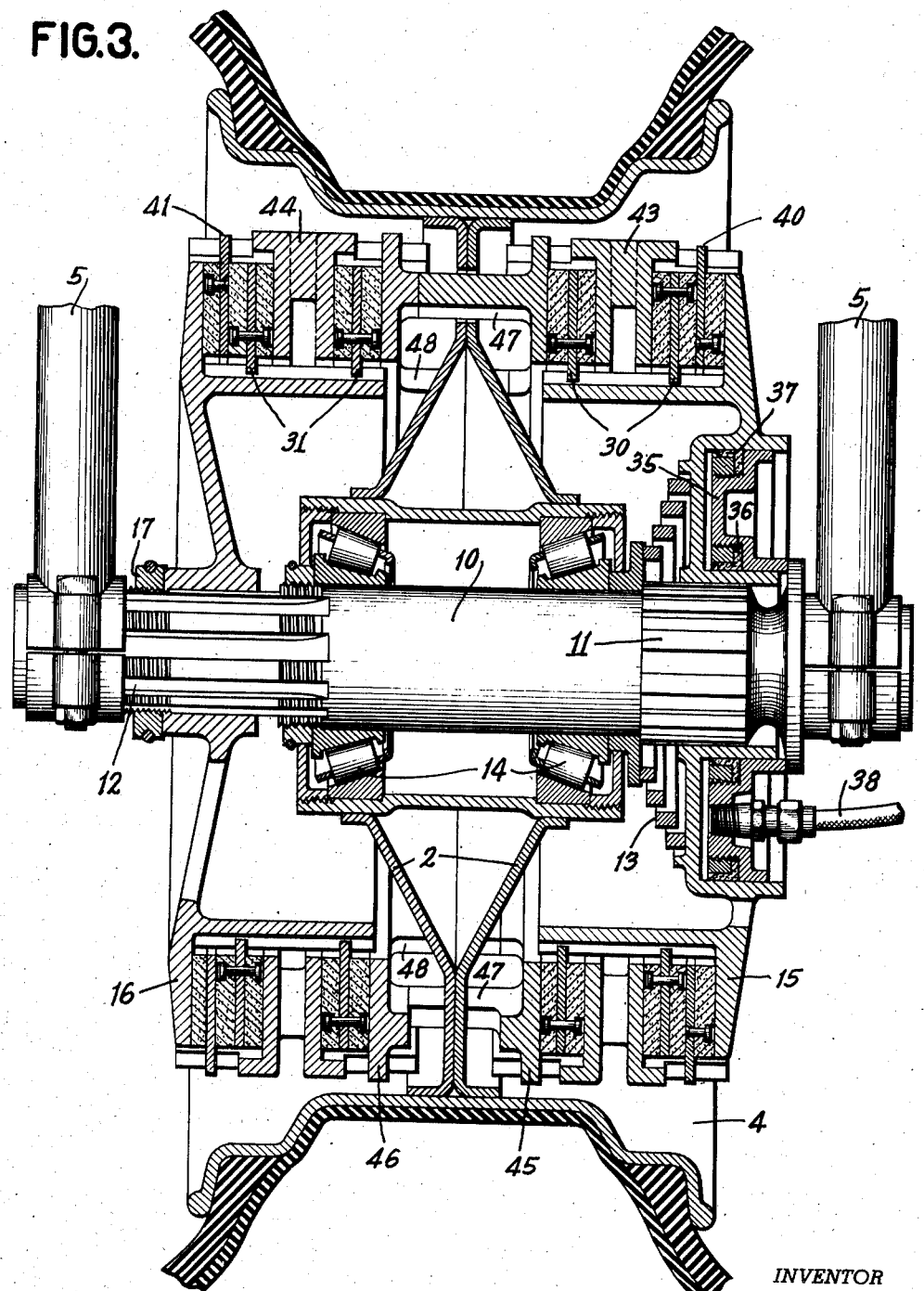

Patented Aug. 18, 1942

2,293,213

UNITED STATES PATENT OFFICE 2,293,213

BRAKE MECHANISM

Alden E. Osborn, Mount Vernon, N. Y.

Application July 1, 1941, Serial No. 400,620

12 Claims. (Cl. 188—72)

The object of my invention is to provide a friction brake mechanism, particularly suitable for use with the landing wheels of aeroplanes, which is relatively light in weight, has large braking surfaces in relation to its size, and provides improved cooling together with freedom from seizing or irregular action.

The particular feature of my brake mechanism is the division of the brake surfaces into a plurality of separate units whereby the parts heated by friction are spaced a relatively great distance apart and the heat thereof distributed over a relatively large area.

In the accompanying drawings—

Figure 3 represents a partial sectional elevation of a further modification of Figure 1.

Figure 1:
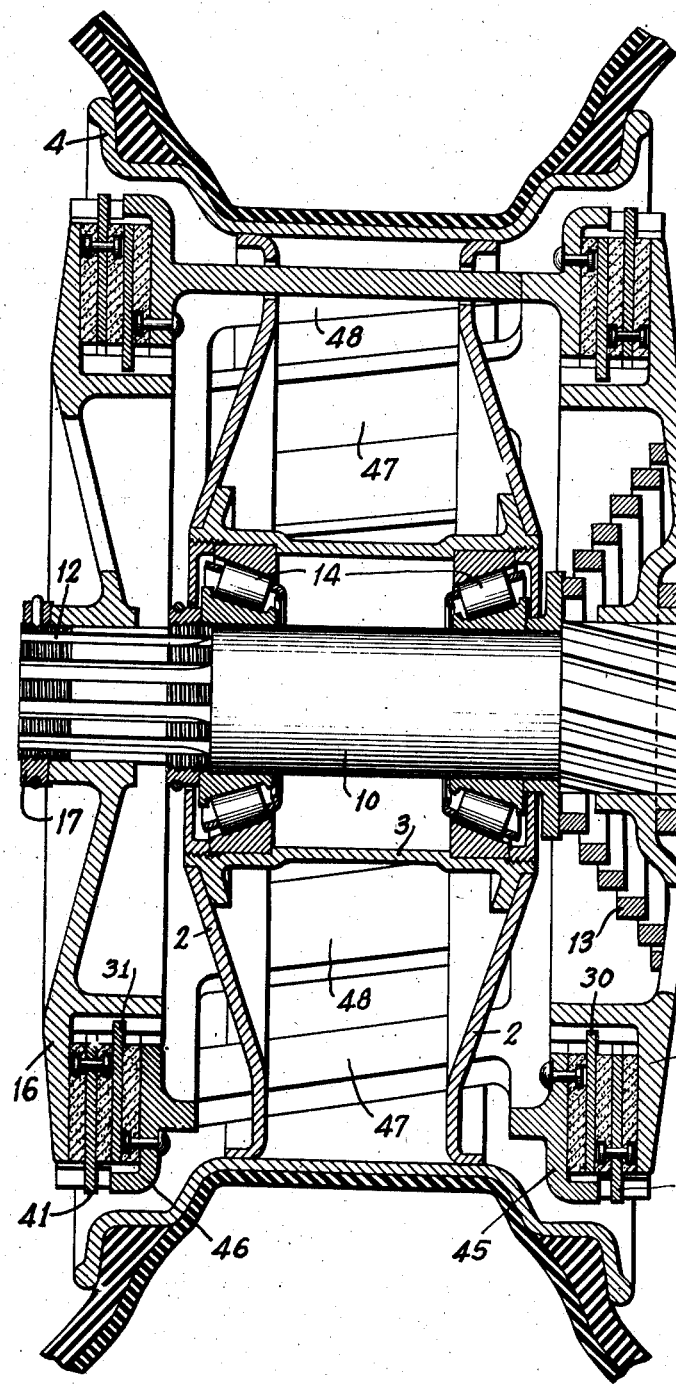
Figure 1 represents a partial sectional elevation of one form of my invention.

In Figure 1 the axle 10 is shown as of a type non-rotatably fastened to one side only to the supporting member 5 of the plane or vehicle having my brake mechanism, altho both ends of the axle may be non-rotatably fastened to the plane or vehicle as shown in Figure 3. The axle in Figure 1 is provided with keys 11 on one side of the wheel bearings 14 and with keys 12 on the other side of the wheel bearings and these keys carry brake discs 15 and 16 so that they are longitudinally slidable thereon. The disc 16 is arranged to be adjusted to different positions along the axle by rotating the adjusting nut 17, while the disc 15 is moved longitudinally on the axle 10 against the pressure of the brake release spring 13 by means of the brake actuating mechanism which may be of any form capable of exerting a considerable pressure to cause this longitudinal movement of the disc when the brake application is desired. In this figure the actuating means is shown as comprising a lever 25 that is connected to the other brake operating parts of the plane or vehicle and is pivoted on pins 26 carried by lugs on a collar 27 that is fastened to the axle 10. The short ends of this lever engage projections (shown by the dotted lines) on a collar 18 that bears against the disc 15 so that when the lever 25 is moved the disc would be given the required longitudinal movement to apply the brake.

The arrangement of the brake surfaces form an important feature of my invention and they comprise a series of discs 30 and 31 keyed to the discs 15 and 16 and a series of discs 40 and 41 keyed to the members 45 and 46 carried by the wheel. The members 45 and 46 are provided with a number of arms 47 and 48 that pass thru openings in the wheel discs 2 with the ends of these arms having contact with the opposed member so that movement of one member would be transmitted to the other member thru both sets of arms. The disc 15 is arranged to engage the friction disc surfaces 30 and 40 and compress these surfaces against the member 45 which in turn causes the member 46 to move to put pressure on the discs 31 and 41 friction surfaces and against the disc 16. The brake action takes place on the brake surfaces at both sides of the wheel and at a relatively great distance apart thus reducing and preventing the localization of the heat in one place as is the case with the usual friction brake mechanism. It will be noticed, moreover, that the total area of the wearing surfaces of the brake is very large, even with the number of friction surfaces shown in the accompanying drawings, and that, by increasing the number of discs to the maximum the space allows, the area of the brake friction surface can be made even larger.

While it is obvious that baffles or enclosing discs can be used to keep out water and dirt and they would be used if this brake were fitted to road vehicles, they are not shown in the drawings as it is not believed that they are desirable for planes because of the added weight and their obstruction to the circulation of the cooling air. In a plane the wheels are usually drawn up into the wings or fuselage in flying and at other times they are under the wings and protected from direct rain. It should also be understood that, while the wheels are shown, in the drawings, as having the pressed discs 2 connecting the hub 3 and rim 4, wire or other forms of spokes may be used provided the member for transmitting the brake force from one side of the wheel to the other can be passed thru this rim and hub-connecting means.

As shown in Figure 1 the mechanism has provision for servo or self-energizing action in two different ways, both of which may be combined in the one mechanism, as shown in this figure, or one only may be used with each brake. One of the methods by which this self-energizing is obtained is by having the key 11 on the axle and the keyways on the disc 15 in spiral form with the spirals slanting in the direction of the rotation of the wheel so as to increase the braking pressure of the disc 15 when the friction surfaces on the discs 30 and 40 are engaged by pressure of the lever 25 because of the slant of the keyways wedging the disc 15 more forcibly in a direction to increase the pressure beyond the pressure brought upon it by the lever. Not only would the increased braking pressure be brought against the discs 30 and 40 but the pressure would be transmitted to the discs 31 and 41 thru the action of the members 45 and 46. The second method of obtaining servo action, as illustrated in Figure 1, comprises forming the arms 47 and 48 on the members 45 and 46 and the wheel disc openings at an angle so that, on the brake being engaged and producing a retarding action on the members 45 and 46, the rotation of the wheel, tends to force the members sideways and add to the pressure on the friction surfaces which, however, would only come against the friction surfaces on either the group of discs 30 and 40 or on the group of discs 31 and 41, depending on the direction in which the arms slant. It is obvious that with the arms 47 and 48 slanting in the direction shown in Figure 1 the rotation of the wheels in a direction to increase the servo action thru the spiral keys 11 would tend to cause a somewhat greater pressure on the friction surfaces of the discs 30 and 40 than on the friction surfaces of the discs 31 and 41 and that the rotation of the wheel in the opposite direction would, while reducing the servo action of the keys 11, increase the pressure on the surfaces of the discs 31 and 41 thru the action of the slant of these arms 47 and 48. Thus a powerful self-energizing or servo action, shifting from one or the other group of friction surfaces, could be obtained for either direction of the wheel's rotation and while such two-direction self-energizing seems hardly required for aeronautical applications, it may be desirable with certain motor vehicle brakes.

Figure 2:
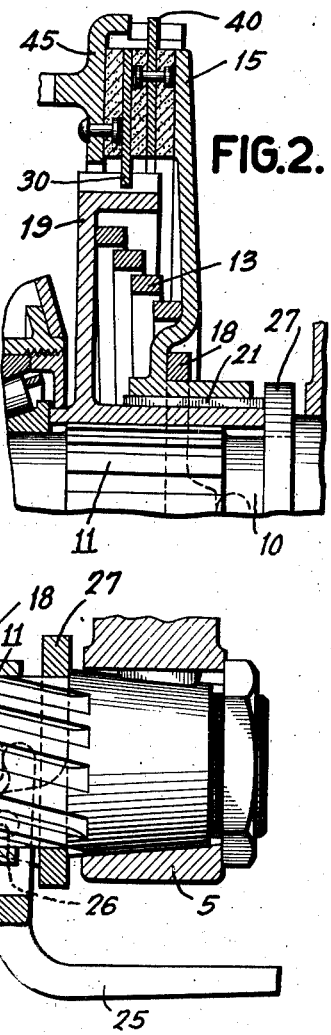
Figure 2 represents a partial sectional elevation of a modification of a detail of Figure 1.

In the modification shown in Figure 2 the disc 15 is subject only to the turning action of the one friction surface with which it is in contact, the main friction of the adjacent braking surfaces tending to turn a separate member 19 that is rigidly keyed to the axle 10. This disc arrangement has the advantage of making the brake somewhat easier to operate when servo action is not desired, by reason of the fact that the fraction between the disc 15 and the keys 21 is less than that between the disc and keys 11 in the form shown in Figure 1. If a servo action is desired the keys 21 and the keyways on the disc 15 can be made of spiral form so that the rotating action of the brake application on the disc 15 causes the disc to be moved in the direction to apply the brake with additional pressure in the same way as do the spiral keys 11 of Figure 1.

In the modified form of my invention shown in Figure 3 a different means for causing the brake operation is illustrated in that the disc is given its braking movement by direct-acting air or hydraulic pressure. This operating means comprises a piston 35 that surrounds the hub of the disc 15 and is packed against leakage around the hub of the disc 15 by a packing cup 36 and is packed against leakage between it and the cylinder part of the disc 15 by a packing cup 37. The piston 35 rests against a shoulder on the axle 10 and has a pipe 38 thru which the brake-operating air or fluid can be admitted into the cylinder space. The pressure-actuated device functions when the air or fluid is admitted thru the pipe 38 to move the disc 15 longitudinally, as is the case with the mechanical device of Figure 1, and one can be substituted for the other according to the method of brake operation desired. The mechanism of Figure 3 is modified by having the keys 11 and projecting arms 47 and 48 straight so that no servo action is provided, altho, of course, the spiral keyways and arms can be used as shown in Figure 1, should the additional pressure be required. The brake mechanism of Figure 3 is also modified by having intermediate members 43 and 44 between the friction discs 15 and 16 and the members 45 and 46. The members 43, 44, 45 and 46 are keyed together by teeth and projections so that they all rotate with the wheel as a unit. This form of my invention has the heating effect from the application of brake pressure even more thoroughly distributed than in the form shown in Figure 1. The number of disc and friction surfaces in the different disc groups can be varied according to the requirements.

I claim:

1. In a brake mechanism for wheeled vehicles, a friction surface on the wheel of said vehicle, a friction surface on the axle of said wheel, controllable means at one side of said wheel for forcibly engaging said wheel and said axle friction surfaces, and adjusting means, comprising a longitudinally movable member extending thru the wheel between the wheel bearing and the wheel rim, for compensating for wear on said friction surface at the other side of said wheel from said controllable means.

2. In a brake mechanism for wheeled vehicles, a friction surface on the wheel of said vehicle at one side thereof, a friction surface on the axle of said vehicle and engageable with said wheel friction surface, controllable means at the side of said wheel adjacent to said friction surfaces for forcibly engaging said friction surfaces, and adjusting means, comprising a longitudinally movable member extending thru the wheel between the wheel bearing and the wheel rim, for compensating for wear on said friction surfaces at the other side of said wheel from said friction surfaces.

3. In a brake mechanism for wheeled vehicles, a friction surface on the wheel of said vehicle at the side thereof, a friction surface on the axle of said wheel and engageable with said wheel friction surface, and means at the other side of said wheel from said friction surfaces for forcibly engaging the wheel and axle friction surfaces, said means communicating said engaging pressure to said friction surfaces by members extending thru the wheel between the wheel bearing and the wheel rim.

4. In a brake mechanism for wheeled vehicles, a friction surface on the wheel of said vehicle at the side thereof, a friction surface on the axle of said wheel and engageable with said wheel friction surface, and adjusting means for compensating for wear on said friction surfaces at the side of said wheel adjacent to said friction surfaces, and means, comprising a longitudinally movable member extending thru the wheel between the wheel bearing and the wheel rim, for forcibly engaging said wheel and axle friction surfaces at the other side of said wheel from said friction surfaces.

5. In a brake mechanism for wheeled vehicles, friction surfaces on the wheel of said vehicle at both sides thereof, friction surfaces on the axle of said wheel at both sides thereof and engageable with said wheel friction surfaces, means for forcibly engaging all said wheel and axle friction surfaces at one side of said wheel and adjusting means for compensating for wear on all said friction surfaces at the other side of said wheel from said engaging means and acting between the axle and one said axle friction surface to move said surface longitudinally in relation to said axle.

6. In a brake mechanism for wheeled vehicles, friction surfaces on the wheel of said vehicle at both sides thereof, friction surfaces on the axle of said wheel at both sides thereof and engageable with said wheel friction surfaces, means at one side of said wheel for forcibly engaging said wheel and axle friction surfaces comprising a member movable longitudinally in relation to the said axle and adapted to engage the adjacent friction surfaces and to give the members having said surfaces a longitudinal movement, and means, comprising a member longitudinally movable in relation to said wheel, for transmitting the longitudinal movement of said friction surface members adjacent to said first-mentioned longitudinally movable member thru the part of said wheel connecting the wheel bearing and the wheel rim, whereby the longitudinal movement of said friction surface members adjacent to said first-mentioned member also applies pressure to the wheel and axle friction surfaces at the other side of the wheel from said first-mentioned member.

7. In a brake mechanism for wheeled vehicles, friction surfaces on the wheel of said vehicle at both sides thereof, friction surfaces on the axle of said wheel at both sides thereof and engageable with said wheel friction surfaces, means at one side of said wheel for forcibly engaging said wheel and axle friction surfaces comprising a member movable longitudinally in relation to said axle and adapted to engage the adjacent friction surfaces and to give the members having said surfaces a longitudinal movement, means for transmitting the longitudinal movement of said friction surface members thru the part of said wheel connecting the wheel bearing and the wheel rim whereby the longitudinal movement of said friction surface members adjacent to the longitudinally movable member also applies pressure to the wheel and axle friction surfaces at the other side of the wheel from said longitudinally movable member, and adjusting means at the side of said wheel adjacent to these last-mentioned friction surface members for compensating for wear on all said friction surfaces.

8. In a brake mechanism for wheeled vehicles, friction surfaces on the wheel of said vehicle, friction surfaces on the axle of said wheel and engageable with said wheel friction surfaces, means at one side of said wheel for forcibly engaging all said wheel and axle friction surfaces comprising a member movable longitudinally in relation to said axle and carrying a part of said axle friction surfaces, and controllable means to cause said longitudinal movement of said member, and means whereby the pressure to cause the longitudinal movement is caused to increase independently of the first-mentioned means, comprising a spirally arranged key system between the longitudinally movable member and said axle whereby the rotation of said wheel, when said wheel and axle friction surfaces are engaged, moves said member with additional pressure thru the wedge action of said spiral keys.

9. In a brake mechanism for wheeled vehicles, friction surfaces on the wheel of said vehicle at both sides thereof, friction surfaces on the axle of said wheel and engageable with said wheel friction surfaces, means at one side of said wheel for forcibly engaging all said wheel and axle friction surfaces comprising a member movable longitudinally in relation to said axle and adapted to engage the said friction surfaces to give said members having said surfaces a longitudinal movement, means for transmitting the longitudinal movement of said surfaces, thru the part of said wheel connecting the wheel bearing and the wheel rim to cause the longitudinal movement of said friction surface members on the other side of the wheel, said connecting means passing thru said wheel having the portions thereof in contact with said wheel and the portions of said wheel having contact with said connecting means at an angle to the axis of said wheel to form a spiral keyway system whereby the braking resistance against the rotation of the wheel increases the pressure on the said brake friction surfaces contacted by the movement of said connecting means.

10. In a brake mechanism for wheeled vehicles, friction surfaces on the wheel of said vehicle at both sides thereof, friction surfaces on the axle of said wheel and engageable with said wheel friction surfaces, means at one side of said wheel for forcibly engaging all said wheel and axle friction surfaces, and an intermediate longitudinally movable member between said wheel friction surfaces and the wheel adapted to transmit the resistance to the rotation of said wheel friction surfaces, when said wheel and axle friction surfaces are forcibly engaged, to said wheel.

11. In a brake mechanism for wheeled vehicles, a friction surface on the wheel of said vehicle at the side thereof, a friction surface on the axle of said wheel and engageable with said wheel friction surface, and means for forcibly engaging said wheel and axle friction surfaces comprising a member longitudinally movable in relation to said axle at the other side of said wheel from said friction surfaces, and a member longitudinally movable in relation to said wheel and extending thru the part of said wheel between the wheel bearing and the wheel rim for transmitting the movement of said first-mentioned longitudinally movable member to said friction surfaces.

12. In a brake mechanism for wheeled vehicles, a friction surface on the wheel of said vehicle, a friction surface on the axle of said wheel and engageable with said wheel friction surface, means at the side of said wheel for forcibly engaging said wheel and axle friction surfaces comprising a member longitudinally movable in relation to said axle, and controllable means to cause said longitudinal movement of said member, and means whereby the pressure to cause the longitudinal movement is increased independently of the first-mentioned means comprising a spirally arranged key system between the longitudinally movable member and said axle whereby the rotation of said wheel when said wheel and axle friction surfaces are engaged, moves said member with additional pressure thru the wedge action of said spiral keys.

ALDEN E. OSBORN.